United States Patent
Lee et al.

(10) Patent No.: US 7,234,916 B2
(45) Date of Patent: Jun. 26, 2007

(54) METHOD AND APPARATUS FOR BALANCING GAS TURBINE ENGINES

(75) Inventors: Michael J. Lee, Peabody, MA (US); Brian Edward Dix, Ipswich, MA (US); Max Freedman, Marblehead, MA (US); William Joseph Adelmann, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 10/942,510

(22) Filed: Sep. 16, 2004

(65) Prior Publication Data

US 2006/0053882 A1    Mar. 16, 2006

(51) Int. Cl.
*F01D 25/04* (2006.01)
(52) U.S. Cl. .................. 415/119; 416/144; 416/500
(58) Field of Classification Search .. 74/573.1–573.13, 74/572.1, 572.11, 572.4; 73/468; 60/772, 60/805; 29/407.05, 889.21; 415/119; 416/144, 416/145, 500; 464/180
See application file for complete search history.

(56) References Cited

U.S. PATENT DOCUMENTS

| | | | | |
|---|---|---|---|---|
| 1,645,323 A | * | 10/1927 | Griswold | ..................... 464/180 |
| 2,708,483 A | * | 5/1955 | Camping et al. | ........... 416/144 |
| 2,715,446 A | * | 8/1955 | Felt | .............................. 416/145 |
| 2,861,471 A | * | 11/1958 | Kronenberg | ............. 74/571.11 |
| 3,916,495 A | * | 11/1975 | Klassen et al. | ............. 416/144 |
| 4,361,213 A | * | 11/1982 | Landis et al. | ................ 416/144 |
| 4,784,012 A | * | 11/1988 | Marra | ........................ 416/144 |
| 5,011,374 A | | 4/1991 | Miller | |
| 5,285,700 A | * | 2/1994 | Lau | ............................. 416/144 |
| 5,545,010 A | | 8/1996 | Cederwall et al. | |
| 5,767,403 A | * | 6/1998 | Kopp et al. | ................... 73/468 |
| 6,829,934 B2 | | 12/2004 | Wolf et al. | |
| 6,931,861 B2 | * | 8/2005 | Wagne | ........................ 416/144 |
| 2002/0184946 A1 | | 12/2002 | Wolf et al. | |
| 2004/0020216 A1 | | 2/2004 | Wagner | |

FOREIGN PATENT DOCUMENTS

| | | |
|---|---|---|
| EP | 1256790 A2 | 11/2002 |
| EP | 1380722 A1 | 1/2004 |
| GB | 2265964 A | 10/1993 |

OTHER PUBLICATIONS

Search Report; Place of Search—Munich; Dated Dec. 15, 2006; Reference No. 134338/11031; Application No./Patent No. 05255621.4-2315; pgs.

* cited by examiner

*Primary Examiner*—Ninh H. Nguyen
(74) *Attorney, Agent, or Firm*—William Scott Andes; Armstrong Teasdale LLP

(57) ABSTRACT

A method and apparatus is provided for field balancing an assembly including a power turbine. The method includes coupling the power turbine to a load, identifying a first balancing plane that is aft of the power turbine, and identifying a second balancing plane that is forward of the power turbine. A balancing correction is determined at each of the first and second balancing planes. A balance weight is mounted at the first balancing plane based on the balancing correction determined for the first balancing plane, and a balance weight is mounted at the second balancing plane based on the balancing correction determined for the second balancing plane, wherein each balance weight at the second balancing plane is coupled to a respective bolt head without removing the bolt.

17 Claims, 3 Drawing Sheets though the plurality of couplers. Each coupler includes a head portion, an elongated shank portion extending from the head portion along a longitudinal axis of the coupler, and a threaded stud extending from the head portion along the longitudinal axis and opposite the shank portion. A balance weight is configured to be coupled to each of the plurality of couplers.

METHOD AND APPARATUS FOR BALANCING GAS TURBINE ENGINES

BACKGROUND OF THE INVENTION

This invention relates generally to gas turbine engines, and more specifically to methods and apparatus for balancing an assembly that includes a gas turbine engine.

At least some known gas turbine engines include, in serial flow arrangement, a compressor, a combustor, a high pressure turbine, and a low pressure turbine. The compressor, combustor and high pressure turbine are sometimes collectively referred to as the gas generator or core engine. Compressed air is channeled from the compressor to the combustor where it is mixed with fuel and ignited. The combustion gasses are channeled to the turbines which extract energy from the combustion gasses to power the compressors and to produce useful work to propel an aircraft in flight or to power a load, such as an electrical generator.

Balancing turbine engines facilitates the avoidance of potentially destructive vibrational forces during engine operation. Balancing is achieved by rotating the assembly and determining the magnitude and location of each imbalance. Material is then added or removed to correct the unbalance. Generally, the rotating components are balanced individually, and after the components are assembled, the assembly is then balanced to correct for any cumulative unbalance in the assembly. Within at least some applications, the low pressure turbine or power turbine is coupled to other rotating components that necessitate further balancing.

Within at least some known engine assemblies, the power turbine, is coupled to a generator. When the engine is installed in a vessel, it is desirable that the engine and generator be field balanced as installed to facilitate preventing the generation of potentially damaging vibrational forces being induced to the surrounding vessel. Typically, balancing in two planes is recommended to lower the vibration to acceptable limits. In two-plane balancing of the engine and generator assembly, an aft plane of the power turbine and a second plane forward of the power turbine are typically selected as balancing planes. While the aft plane of the power turbine is usually readily accessible, access to a forward balancing plane may be less accessible. For example, in at least some engine assemblies, the front balancing plane is only accessible through drive shaft cover access ports. Moreover, in at least some engine assemblies, field balancing may require at least a partial disassembly of a bolted joint to install a balance weight under a nut or a bolt. However, disassembling such joints may actually cause another imbalance if the components are misaligned when reassembled.

BRIEF DESCRIPTION OF THE INVENTION

In one aspect, a method is provided for field balancing a gas turbine engine assembly including a power turbine. The method includes coupling the power turbine to a load, identifying a first balancing plane that is aft of the power turbine, and identifying a second balancing plane that is forward of the power turbine. A balancing correction is determined at each of the first and second balancing planes. A balance weight is mounted at the first balancing plane based on the balancing correction determined for the first balancing plane, and a balance weight is mounted at the second balancing plane based on the balancing correction determined for the second balancing plane, wherein each balance weight at the second balancing plane is coupled to a respective bolt head without removing the bolt.

In another aspect, a system for balancing a rotating assembly including a gas turbine engine is provided. The system includes a plurality of couplers configured to couple the engine to a rotating load such that torque from the engine is transmitted to the rotating load through the plurality of couplers. Each coupler includes a head portion, an elongated shank portion extending from the head portion along a longitudinal axis of the coupler, and a threaded stud extending from the head portion along the longitudinal axis and opposite the shank portion. A balance weight is configured to be coupled to each of the plurality of couplers.

In another aspect, a balanced rotating assembly is provided that includes a rotating load, a gas turbine engine drivingly coupled to the rotating load, and a balancing system. The balancing system includes a plurality of fasteners located at a balancing plane for the assembly. Each of the fasteners is configured to couple the engine to the rotating load such that torque from the engine is transmitted to the rotating load. Each fastener includes a head portion, an elongated shank portion extending from the head portion along a longitudinal of the fastener, and a stud extending from the head portion along the longitudinal axis and opposite the shank portion. A balance weight is configured to be coupled to each of the plurality of fasteners.

DETAILED DESCRIPTION OF THE INVENTION

Figure 1:
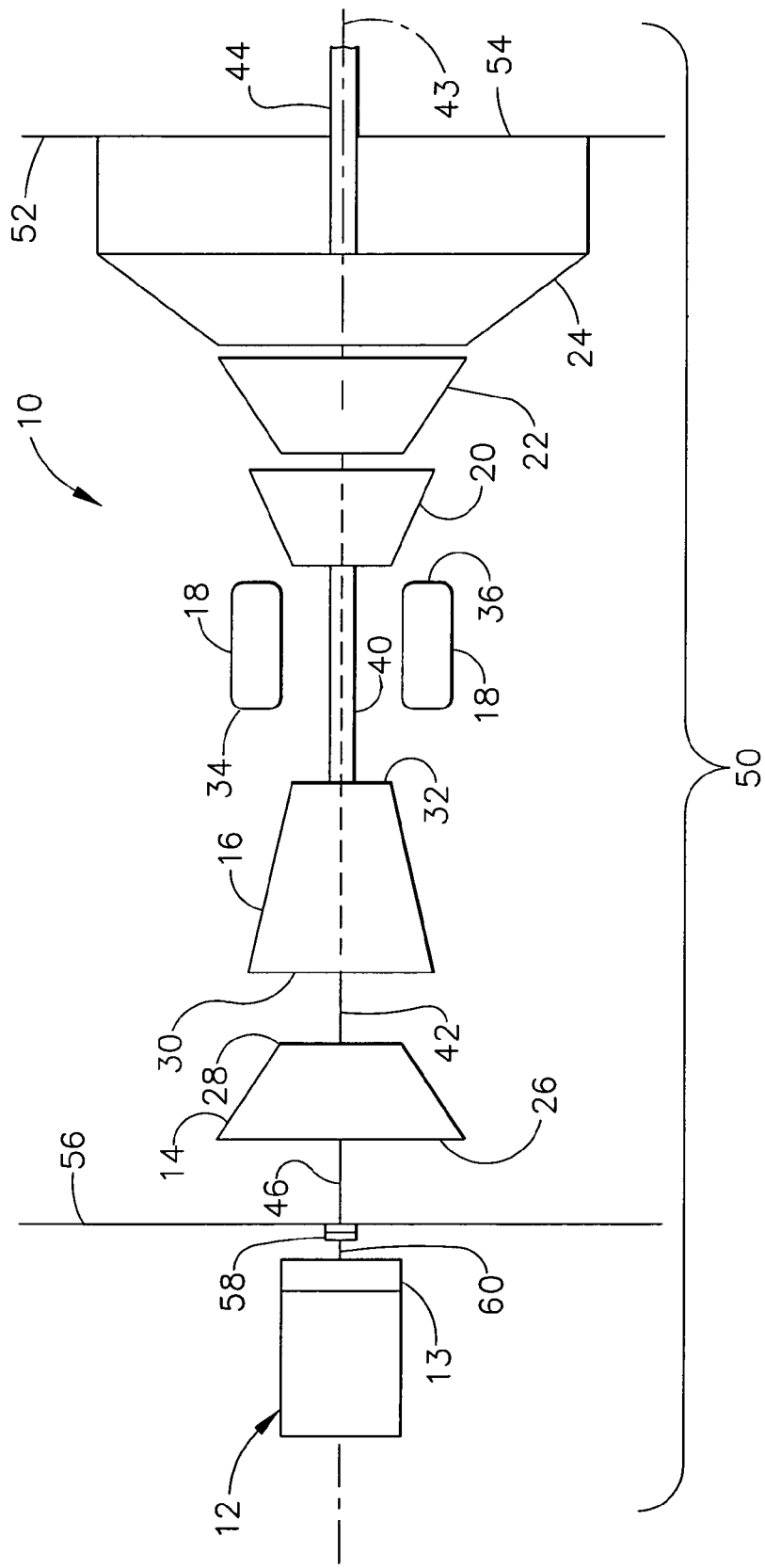
FIG. 1 is a block diagram of an exemplary gas turbine engine including a generator.

FIG. 1 is a block diagram of a gas turbine engine 10 in an installation wherein engine 10 is used to power a load such as an electric generator which is generally represented at 12. Generator 12 may be driven through a gearbox section 13. Hereinafter, references to generator 12 shall be understood to also include gearbox section 13. The engine 10 includes, in serial flow relationship, a low pressure compressor or booster 14, a high pressure compressor 16, a combustor 18, a high pressure turbine 20, a low pressure, or intermediate, turbine 22, and a power turbine 24. Low pressure compressor or booster 14 has an inlet 26 and an outlet 28. High pressure compressor 16 includes an inlet 30 and an outlet 32. Combustor 18 has an inlet 34 that is substantially coincident with high pressure compressor outlet 32, and an outlet 36. High pressure turbine 20 is coupled to high pressure compressor 16 with a first rotor shaft 40, and low pressure turbine 22 is coupled to low pressure compressor 14 with a second rotor shaft 42. Rotor shaft 42 is coaxially positioned within first rotor shaft 40 about a longitudinal centerline axis 43 of engine 10. In one embodiment, gas turbine engine 10 is an LM500 engine commercially available from General Electric Company, Cincinnati, Ohio.

During operation, outside air is drawn into inlet 26 of low pressure compressor 14, wherein the air is compressed and supplied from low pressure compressor 14 to high pressure compressor 16. High pressure compressor 16 compresses the air additionally and delivers high pressure air to combustor 18 wherein it is mixed with fuel and ignited to generate high temperature combustion gases. The combustion gases are channeled from combustor 18 to drive turbines 20, 22, and 24.

While the invention will be described in terms of an electrical generator driven by a gas turbine engine, it should be understood that the following description is only for illustrative purposes and is but one potential application of the inventive concepts herein. It is appreciated that the benefits and advantages of the invention may accrue equally to other types of loads that may be powered by a gas turbine engine such as the engine 10.

In one embodiment of engine 10, power turbine 24 and low pressure turbine 22 are both coupled to second rotor shaft 42. Generator 12 is coupled to a forward extension shaft 46 of second rotor shaft 42. Engine 10 may also be used to drive a load (not shown) which may be located aft of engine 10 and may be drivingly coupled to a power turbine shaft 44. Placement of the load forward of engine 10 offers an advantage of locating the load away from the heat of the exhaust of engine 10.

Engine 10 and generator 12 form a power generation unit 50. Although engine 10 and generator 12 are balanced as separate units, it is also necessary to balance power generation unit 50 to facilitate the avoidance of destructive vibration that could damage engine 10 or generator 12. Balancing power generation unit 50 in two planes facilitates reducing vibration levels during operation of power generation unit 50.

In one embodiment of the invention, a first or aft balancing plane 52 is identified at an aft end 54 of power turbine 24 and a second balancing plane 56 is identified forward of power turbine 24 at a coupling 58 between forward extension shaft 46 and a drive shaft or input shaft 60 of generator 12. Balancing plane 56 is selected to extend through a bolted joint 70 (see FIG. 2) that couples extension shaft 46 to coupling 58.

Heretofore, balancing has been accomplished by removing a nut from a load carrying shank of a bolt at the balancing plane and adding a balance weight or balance washer to the bolt and replacing the nut. This is readily accomplished at aft balancing planes, such as plane 52, due to the accessibility of power turbine 24. However, in some applications, access to a bolted joint at second or forward balancing planes, such as plane 56, may be restricted.

In one embodiment, extension shaft 46, coupling 58 and drive shaft 60 are enclosed in a cover 64 (see FIG. 2) that is provided to cover these rotating components so that personnel or other items do not inadvertently come into contact with extension shaft 46, coupling 58, and drive shaft 60. The cover 64 is provided with a port 66 at second balancing plane 56, to facilitate access to coupling 58, end 72 (see FIG. 2) of extension shaft 46, and drive shaft 60. However, access to coupling 58 at second balancing plane 56 is sufficiently restricted that removal of a nut or bolt for the attachment of balancing weights at coupling 58 is difficult.

Figure 2:
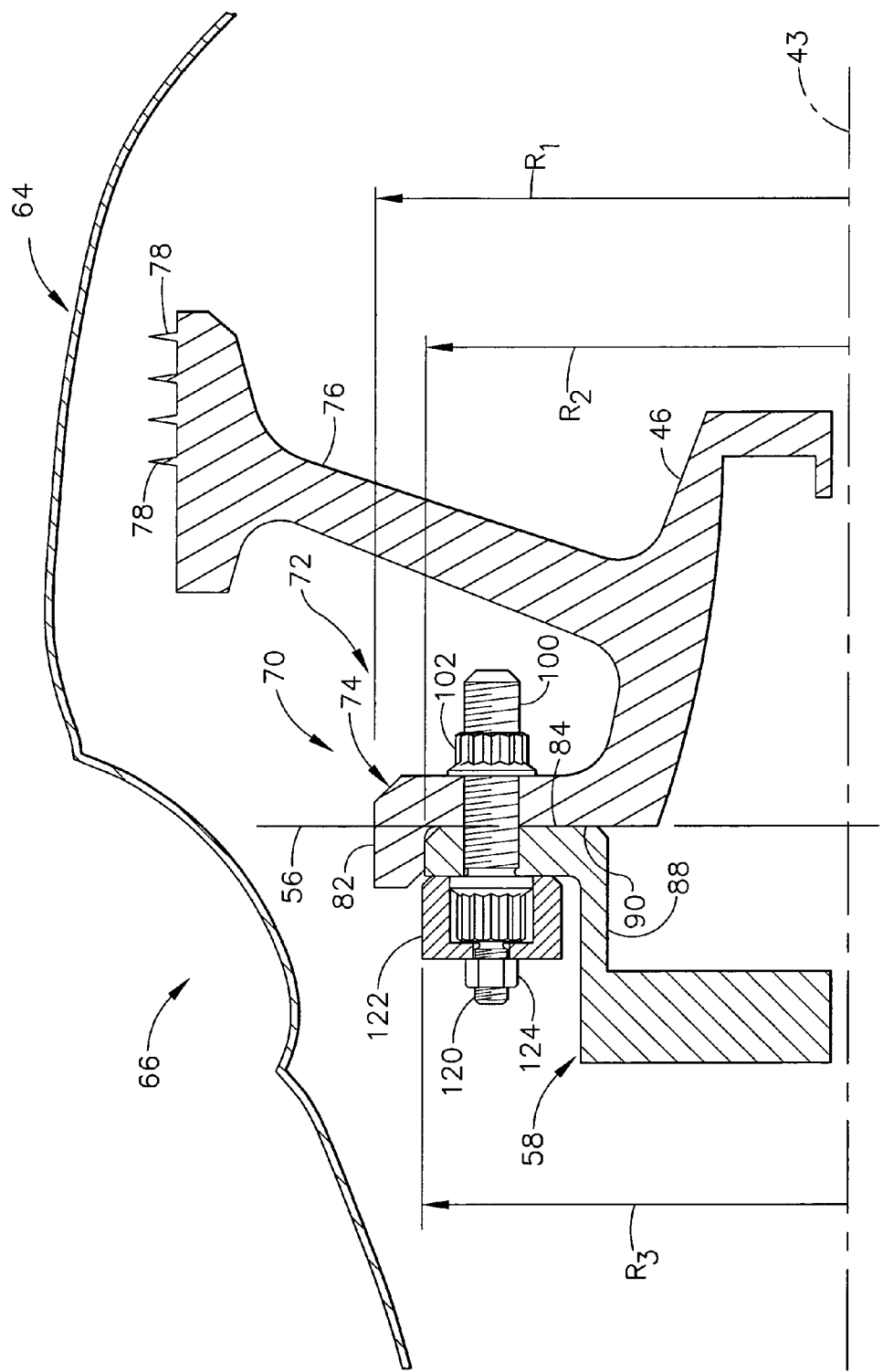
FIG. 2 is a schematic diagram of an exemplary bolted coupling joint that may be used with the gas turbine engine and generator shown in FIG. 1.

FIG. 2 is a schematic diagram of an exemplary bolted coupling joint 70 to couple generator 12 and extension shaft 46 to drivingly connect engine 10 and generator 12. More specifically, bolted joint 70 couples extension shaft 46 to coupling 58 which is joined to drive shaft 60 (see FIG. 1). Extension shaft 46 has a forward mounting end 72 that includes a circumferential mounting flange 74 and a disk 76 that includes a plurality of seals 78. In one embodiment, seals 78 are labyrinth or knife edge seals that seal against a sealing surface (not shown) formed on an inner surface of drive shaft cover 64 to facilitate minimizing a leakage of gas into the area of coupling 58 in the coupling and drive shaft cover 64. Seals 78 also facilitate the establishment of a thrust balance on the low pressure rotor system including low pressure turbine 22, power turbine 24, and low pressure compressor 14. Mounting flange 74 includes a circumferential lip 82 that extends forwardly from flange 74 and a mating face 84. Lip 82 includes a first or outer radius $R_1$ and a second or inner radius $R_2$ that is smaller than radius $R_1$. In one embodiment, lip 82 is continuous, however, in other embodiments, lip 82 may be segmented.

Coupling 58 includes a circumferential coupling flange 88 that has a mating face 90. Coupling flange 88 has an outer radius $R_3$ that is sized such that coupling flange 88 is received within lip 82 so that coupling flange mating face 90 abuts mating face 84 on extension shaft 46. A coupling bolt 100 and coupling nut 102 are provided to hold coupling flange 88 and extension shaft mounting flange 74 together.

Figure 3:
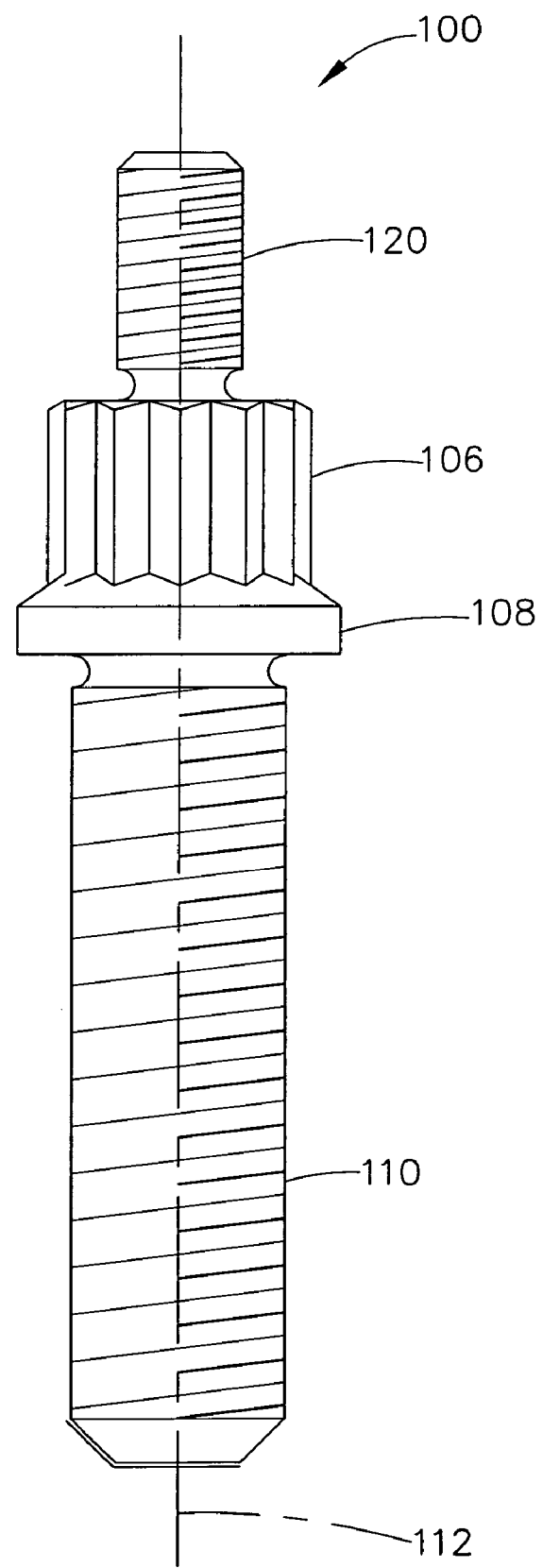
FIG. 3 is a plan view of a coupling bolt shown in FIG. 2.

FIG. 3 is a plan view of coupling bolt 100 shown in FIG. 2. Bolt 100 includes a bolt head 106 that includes a shoulder 108. An elongated shank portion 110 extends from shoulder 108 along a longitudinal axis 112 of bolt 100. Shank portion 110 receives nut 102 to form bolted joint 70 (FIG. 2) at second balancing plane 56. Shank portion 110 and coupling nut 102 are load carrying members at the bolted joint 70. Shank portion 110 transmits a driving torque load from engine 10 to generator 12. Shank portion 110 and coupling nut 102 also provide the clamping load that holds coupling 58 and extension shaft 46 together at bolted joint 70. Bolt 100 also includes a stud 120 that extends from bolt head 106 along longitudinal axis 112 opposite in direction to shank portion 110. In the exemplary embodiment, stud 120 is integrally formed with bolt head 106.

Bolt head 106 and stud 120 are accessible through access port 66 in drive shaft cover 64. Stud 120 is configured to receive a balancing weight or balancing washer 122 (see FIG. 2). Balancing washer 122 is selected to be of a predetermined weight that is calculated to provide a balancing weight adjustment at second balancing plane 56 that is required to balance engine and generator assembly 50. A retaining nut 124 (see FIG. 2) is provided to retain balancing washer 122 on stud 120. Balancing washer 122 may be any of various flat or cup-shaped balancing washers currently known and used in the art.

In operation, the engine 10 is set up and balanced prior to being coupled to generator 12. Engine 10 is then coupled to generator 12 and the assembly 50 is driven and the unbalance measured. Balance adjustments are then calculated for first balancing plane 52 aft of power turbine 24 and second balancing plane 56 forward of power turbine 24. At forward balancing plane 56, balancing weights are selected to provide the required correction and are installed on one or more of bolt heads 106 as required. Access to bolts 100 is gained through a port 66 in drive shaft cover 64.

The above-described balancing system facilitates final trim balancing of the power generation system as installed in the field. The balancing system includes a bolt having a stud integrally formed on the head of the bolt such that balancing weights or washers may be mounted and secured to the head of the bolt without removal of the load carrying nut from the load carrying shank portion of the bolt.

Exemplary embodiments of a balancing system for a power generation assembly that includes a gas turbine engine are described above in detail. The systems and assembly components are not limited to the specific embodiments described herein, but rather, components of each system may be utilized independently and separately from other components described herein. Each system and assembly component can also be used in combination with other systems and assemblies.

While the invention has been described in terms of various specific embodiments, those skilled in the art will recognize that the invention can be practiced with modification within the spirit and scope of the claims.

What is claimed is:

1. A method for field balancing a gas turbine engine assembly including a power turbine, said method comprising:
   coupling the power turbine to a load;
   identifying a first balancing plane that is aft of the power turbine;
   identifying a second balancing plane that is forward of the power turbine;
   determining a balancing correction at each of the first and second balancing planes;
   mounting a balance weight at the first balancing plane based on the balancing correction determined for the first balancing plane; and
   mounting a balance weight at the second balancing plane based on the balancing correction determined for the second balancing plane such that the balance weight contacts a portion of the second balancing plane, wherein each balance weight at the second balancing plane is coupled to a respective bolt head of only one coupler, that includes a threaded stud extending from the bolt head in a direction opposite to an longitudinal extension of a shank portion of the coupler, the balance weight is coupled to the respective bolt head without removing the bolt.

2. A method in accordance with claim 1 wherein mounting the balance weight at the second balancing plane comprises mounting a balance weight to the stud formed on the bolt head.

3. A method in accordance with claim 1 wherein mounting a balance weight at the second balancing plane comprises securing each balance weight to each respective bolt head with a respective nut.

4. A method in accordance with claim 1 wherein identifying a second balancing plane forward of the power turbine comprises identifying the second balancing plane at a bolted joint that is forward of the power turbine.

5. A system for balancing a rotating assembly including a gas turbine engine including a flange and a disk, said system comprising:
   a plurality of couplers configured to couple the engine to a rotating load such that torque from the engine is transmitted to the rotating load through the plurality of couplers, each said coupler comprising a head portion, an elongated shank portion extending from said head portion along a longitudinal axis of said coupler, and a threaded stud extending from said head portion along said longitudinal axis and opposite said shank portion; and
   a balance weight configured to be coupled to each of said plurality of couplers, said threaded stud is configured to retain said balance weight in position relative to said coupler such that a portion of said balance weight contacts said flange.

6. A system in accordance with claim 5 wherein said stud is integrally formed with said head portion.

7. A system in accordance with claim 5 wherein each said coupler comprises a bolt.

8. A system in accordance with claim 5 further comprising a nut received on said stud to retain said balance weight.

9. A system in accordance with claim 5 wherein said balance weight is selected to have a predetermined weight to offset an imbalance at a balancing plane.

10. A balanced rotating assembly comprising:
    a rotating load;
    a gas turbine engine drivingly coupled to said load, said gas turbine engine comprising a flange and a disk; and
    a balancing system comprising:
    a plurality of fasteners located at a balancing plane for said assembly, each of said fasteners is configured to couple said engine to said rotating load such that torque from said engine is transmitted to said rotating load, each said fastener comprising a head portion, an elongated shank portion extending from said head portion along a longitudinal of said fastener, and a stud extending from said head portion along said longitudinal axis and opposite said shank portion; and
    a balance weight configured to couple to each of said plurality of fasteners, said threaded stud is configured to retain said balance weight in position relative to said coupler such that a portion of said balance weight contacts said flange.

11. A balanced rotating assembly in accordance with claim 10 wherein said balance weight is sized to provide a balancing correction for said assembly at said balancing plane.

12. A balanced rotating assembly in accordance with claim 10 wherein said balancing system further comprises a retaining nut to retain said balance weight on said stud.

13. A balanced rotating assembly in accordance with claim 10 further comprising a coupling to couple said engine to said load.

14. A balanced rotating assembly in accordance with claim 13 wherein said balancing plane comprises a bolted joint at said coupling.

15. A balanced rotating assembly in accordance with claim 10 wherein said stud is integrally formed with said fastener.

16. A balanced rotating assembly in accordance with claim 10 wherein said fastener comprises a bolt.

17. A balanced rotating assembly in accordance with claim 10 wherein said engine includes a power turbine and said balancing plane comprises a first balancing plane that is aft of said power turbine and a second balancing plane that is forward of said power turbine.

* * * * *